United States Patent [19]
Igashira et al.

[11] 4,036,183
[45] * July 19, 1977

[54] ROTARY PISTON ENGINE

[75] Inventors: Toshihiko Igashira, Toyokawa; Shunzo Yamaguchi, Mishio; Masami Hujita, Okazaki, all of Japan

[73] Assignee: Nippon Soken, Inc., Nishio, Japan

[*] Notice: The portion of the term of this patent subsequent to Aug. 31, 1993, has been disclaimed.

[21] Appl. No.: 571,743

[22] Filed: Apr. 25, 1975

Related U.S. Application Data

[63] Continuation-in-part of Ser. No. 470,294, May 15, 1974, Pat. No. 3,977,368.

[30] Foreign Application Priority Data

| Apr. 29, 1974 | Japan | 49-48417 |
| May 7, 1974 | Japan | 49-50455 |
| June 14, 1974 | Japan | 49-68576 |

[51] Int. Cl.$^2$ ............................................. F02B 53/10
[52] U.S. Cl. ............................... 123/8.13; 123/8.05; 60/901
[58] Field of Search ............... 123/8.13, 32 ST, 8.05, 123/8.45; 60/901

[56] References Cited

U.S. PATENT DOCUMENTS

| 2,468,451 | 4/1949 | Kutzner | 123/8.13 |
| 3,126,876 | 3/1964 | Kimberley | 123/8.13 |
| 3,483,849 | 12/1969 | Yamamoto | 60/901 X |
| 3,491,729 | 1/1970 | Lamm | 123/8.13 |
| 3,713,425 | 1/1973 | Satta | 123/8.13 |
| 3,777,721 | 12/1973 | Sawada | 60/901 X |
| 3,795,228 | 3/1974 | Shimizu | 60/901 X |
| 3,805,747 | 4/1974 | Nakagawa | 123/8.13 |
| 3,858,558 | 1/1975 | Hart | 123/8.13 |
| 3,893,430 | 7/1975 | Burley | 123/8.13 |

*Primary Examiner*—Clarence R. Gordon
*Attorney, Agent, or Firm*—Cushman, Darby & Cushman

[57] ABSTRACT

A rotary piston engine comprises a housing having a trochoidal peripheral wall and side walls on both sides thereof, a rotor adapted to perform a planetary rotary motion along the inner surface of the peripheral wall, and intake and exhaust ports formed in the housing. The engine performs intake, compression, combustion and exhaust strokes of a working fluid in accordance with the planetary rotary motion of the rotor. An air injection port is formed in the peripheral wall of the housing between the exhaust port and a portion of the minor axis of the trochoidal curve, being adapted to communicate with the intake chamber formed between the peripheral wall and the rotor. Through the injection port, air and fuel are supplied into the housing to prevent recirculation of exhaust gas into the intake chamber of the engine, to stratify an air-fuel mixture of a richness appropriate for spark ignition and an air alone so as to facilitate the combustion of a lean air-fuel mixture as a whole, and to reduce harmful exhaust gases, particularly, hydrocarbon (HC) and carbon monoxide (CO) by the engine operation with the relatively lean air-fuel mixture.

7 Claims, 7 Drawing Figures

ROTARY PISTON ENGINE

This application is a continuation-in-part of Ser. No. 470,294, filed May 15, 1974, and now U.S. Pat. 3,977,368, dated Aug. 31, 1976.

BACKGROUND OF THE INVENTION

1. Field of the Invention

The present invention relates to a rotary piston engine having a housing and a rotor rotatable within the housing to perform four strokes, namely, intake, compression and exhaust of a working fluid. More particularly, the invention is concerned with a reduction of harmful components of the gases exhausted from the rotary piston engine.

2. Description of Prior Art

Because of the structure of the heretofore known rotary piston engine, there have been disadvantages as follows:

a. insufficiently atomized fuel is stratified, for its inertia, at the trailing end of the combustion chamber where it is difficult to burn the fuel, b. for the reason (a), a lean mixture is stratified at the forward end of the combustion chamber so as to be difficult to ignite the mixture, and c. when one of the apex of the rotor passes over the exhaust port, a large amount of the exhaust gas is recirculated from the exhaust chamber into the intake chamber. In order to obtain a smooth operation of the engine, counting for these three disadvantages, it has been required to supply the known rotary engine with a rich mixture of an air-fuel ratio of, in general, approximately 13, consequently the engine has exhausted large amounts of harmful gases such as carbon monoxide (CO) and hydrocarbon (HC). It has been naturally resulted to have a disadvantage of a large fuel consumption.

SUMMARY OF THE INVENTION

It is an object of the present invention to prevent recirculation of the exhaust gas into an intake chamber of the rotary piston engine, to stratify an air-fuel mixture of a richness appropriate for spark ignition and an air alone so as to facilitate the combustion of the lean air-fuel mixture as a whole, and reduce the harmful exhaust gases, particularly, hydrocarbon (HC) and carbon monoxide (CO) by operating engine properly with the relatively lean air-fuel mixture.

The object is achieved by providing an air injection port in the rotor housing of the engine at a location between the exhaust port and the portion of the minor axis of the trochoidal curve of the peripheral wall. The air injection port is so positioned in the housing as to be in communication with an intake chamber of the engine when the intake chamber is in its initial state. The injection port can be provided on either the peripheral wall or the side walls. Through this injection port, air and fuel are introduced into the working chamber of the engine.

It is second object of the invention to prevent recirculation of the exhaust gas into an intake chamber of the engine by the action of the air and fuel introduced into the housing, to enable the engine to keep the rich mixture retaining at about the leading end portion of a combustion chamber by taking the advantage of stratifying, at the leading end portion of the combustion chamber, the air and fuel introduced through the injection port, and to ensure the engine to ignite the mixture readily so that the smooth operation of the engine with the lean mixture is realized, thereby reducing hydrocarbon (HC) and carbon monoxide (CO), and improving the fuel consumption. The reduction of the harmful gases and improvement in the fuel consumption can be also realized by stratifying air alone at the trailing end portion of the combustion chamber where the combustion comes to be difficult. Advantageously, these objects of the present invention can be further achieved by providing the rotor with a recess formed such that the forward portion of the recess is deeper than the afterward portion.

The above and other objects, feature and advantages of the present invention will be described by the way of example with reference to the accompanied drawings.

DESCRIPTION OF PREFERRED EMBODIMENTS

Figure 1:
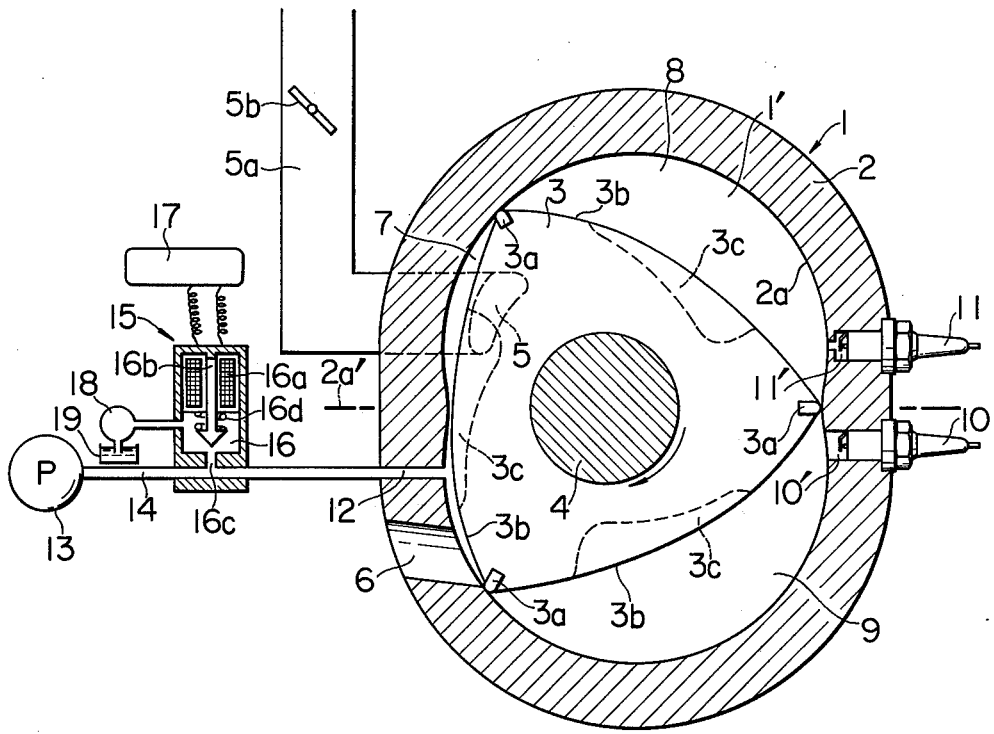
FIGS. 1 and 2 are diagrammatic sectional views of a first embodiment of the rotary piston engine according to the present invention showing the rotor in its different operating positions.
Figure 2:
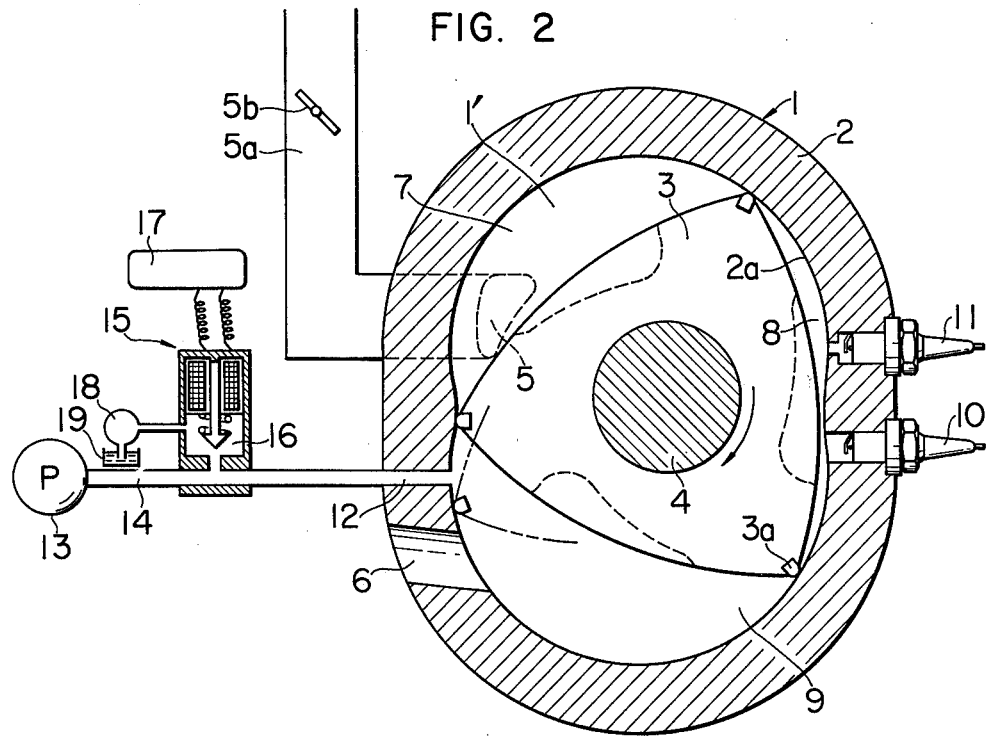

Referring to FIGS. 1 and 2, the first embodiment of the rotary engine according to the invention includes a housing 1 having a rotor housing part 2 and side housing parts 1' (only one of which is shown) disposed on both sides of the rotor housing part. The former has inner surface or peripheral wall 2a formed itself into trochoidal curves having two arches. Reference number 2a' shows a minor axis of the trochoidal curve. The side housing parts 1' have flat walls which form the side walls of the housing 1. A triangloid rotary piston or rotor 3 is disposed within the housing 1 and has apex seals 3a mounted on the rotor at its three apexes. The rotor is so mounted as to perform a planetary rotary motion in a direction indicated by an arcuated arrow so that the apex seal 3a are always in sliding contact at their outer edges with the peripheral wall 2a of the housing 1. The rotor also has side seals (not shown) which are also in sliding contact with the side walls 1'. The rotor has a shaft 4 which is rigidly secured to the center of the rotor and which is eccentric with respect to the center of the housing 1. The shaft 4 serves to transmit the planetary rotary motion of the rotor 3 to the output of the engine through a transmission (not shown). Reference number 5 is an intake port which is in communication with the atmosphere by means of an intake pipe 5a and an air-cleaner (not shown). Said intake port 5 is adapted to supply air alone through the port, and the quantity of the air introduced through the port is regulated by means of a throttle valve 5b. Reference number 6 is an exhaust port discharging to the atmosphere an exhaust gas which is generated from the combustion of the mixture. The intake port 5 is positioned in the side housing on the trailing side of the minor axis of the trochoidal curve with respect to the rotation of the rotor 3 while the exhaust port 6 is positioned on the trailing side of the axis 2a' as viewed on the rotation of the rotor. It will be apparent to those skilled in the art that the intake port 5 may alternatively be formed in the rotor housing part 2 and the exhaust port 6 may alternatively be formed in the side housing part 1'.

The peripheral wall 2a cooperates with sides 3b of the rotor 3 to define three variable-volume working chamber 7, 8 and 9 which are moved along the peripheral wall 2a as the rotor is rotated and each of which is sequentially transformed into intake, compression, combustion, exhaust chambers correspondingly to the respective strokes of the rotor 3. As an example, in the position of the engine shown in FIG. 2, the working chamber 7 is an intake chamber, the working chamber 8 is a compression chamber, and the working chamber 9 is an exhaust chamber. The sides 3b of the rotor 3 are formed therein with recesses 3c respectively, which form parts of the working chambers 7, 8 and 9, respectively. Every one of the recesses 3c are formed such that the depth of the leading end portion of the recess 3c is larger than that of the trailing end portion and the depth is gradually decreased from the leading end portion to the trailing end portion with respect to the rotation of the rotor.

Ignition plugs 10 and 11, which are connected to distributors (not shown), ignitions coils (not shown) etc., are screwed into 10' and 11', respectively, which are formed in the rotor housing part 2 substantially diametrically opposite to the intake port 5 and the exhaust port 6. The holes 10 and 11 are positioned symmetrically with the minor axis 2a', as shown in FIG. 1.

An air injection port 12 is formed in the rotor housing part 2 and opened in the peripheral wall 2a between the minor axis 2a' and the opening of the exhaust port 6. The injection port 12 is adapted to be in communication with the intake chamber 7 in the initial state when any of one of the apex seal 3a of the rotor moves from the exhaust port to the injection port (refer to FIG. 1), or with the exhaust chamber 9 when the apex seal moves over the any other position of the peripheral wall with the exception of the above said position (refer to FIG. 2). In the case where the exhaust port 6 is formed in the side housing part 1', the air injection port 12 may be positioned between the minor axis 2a' and a portion of the peripheral wall 2a adjacent to the exhaust port.

A means 13 is provided to supply air to the air injection port 12 through a passage provided by a pipe line 14. The air supply means 13 is adapted to blow compressed air through the pipe line 14 and the injection port 12 into the working chamber (the intake chamber 7 in the initial state or the exhaust chamber 9). The means 13 may be a vane type pump of a kind which generally used to supply air to exhaust gas cleaners. The air pump may be driven by either the output shaft of the engine or a separate electric motor. A fuel supply means 15 is disposed in the pipe line 14. The fuel supply means 15 may be fuel-injection type or fuel-suction type. In this embodiment, the fuel-injection type is advantageously used. The fuel supply means is constant of a fuel-injection valve which comprises a solenoid valve and which is to inject a fuel into the pipe line 14, an opening and closing valve in the fuel-injection valve, a controlling means 17 for controlling the opening and closing operation of the fuel-injection valve 16 and, consequently, the injection of fuel, a fuel pump 18 for pressing fuel into the fuel-injection valve 16, and a reservoir 19 for storing fuel. The fuel-injection valve 16 includes a coil 16a adapted to be energized and deenergized by the controlling means 17, a needle 16b axially movable according to the energization and deenergization of the coil 16a, an injection orifice 16c adapted to be closed and opened by the needle 16b, and a compression spring 16d biasing the needle 16b toward the orifice 16c being opened to the pipe line 14.

Figure 6:
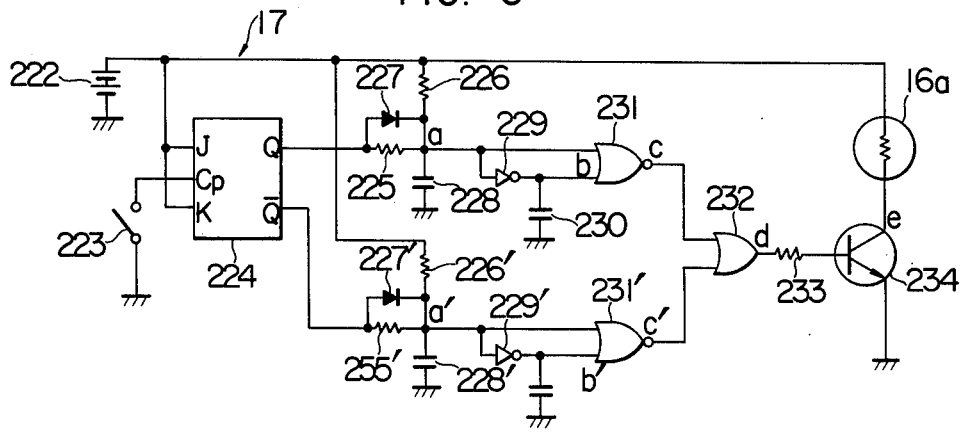
FIG. 6 is an example of an electric circuit diagram used to control a fuel-injection.

The controlling means 17 are operative to emit pulse signals, according to the rotation of the rotor 3, which energizes and deenergizes the coil 16a of the fuel injection valve 16 for controlling the injection of fuel, thereby the coil 16 is caused to lift the needle 16b so as to open the injection orifice 16c for the injection of fuel into the pipe line 14 only when the injection port 12 is communicated with an intake chamber 9. FIG. 6 illustrates an example of a principle eletric circuit of the controlling means 7 for performing the operation discussed above, while FIG. 7 diagrammatically illustrates wave forms of an electric voltage at various points of the circuit shown in FIG. 6. Incidentally, with the circuit arrangement shown in FIG. 6, the period from the time when the rotor reaches its top dead center to the time when the coil 16a of the fuel injection valve 16 is energized and the period of time while the coil is kept energized are invariable. Thus, since the speed of the rotation of the rotor 3 is variable, no means has been possible to control such a operation that the injection of air-fuel mixture through the injection port 12 is started at the same time as the injection port 12 is bought into communication with an intake chamber 7 and that the fuel supply through port 12 to the intake chamber 7 is stopped as well as injection of air through the port 12 is started when the port is communicated with a succeeding exhaust chamber. However, for improving the fuel consumption and elminating discharged quantity of air-fuel mixture which has not yet been burned, through the exhaust port 6, it is necessary that the injection of fuel mixture through the injection port 12 is stopped at least when the port 12 is communicated with an exhaust chamber 9. If the mixture injected through the injection port 12 is to be fed into an intake chamber 7, and the air-fuel mixture is not continuously supplied through the intake port 12 into the intake chamber 7 throughout the period while the port 12 is communicated with the chamber 7, but air is also supplied to the intake chamber 7 during a part of the period, thereby it can come to be possible that the mixture injected through the port 12 is stratified at the leading end portion of the chamber where the ignition of the mixture dose easily and promptly generate. From the structure of the circuit shown in FIG. 6, the purpose of the present invention is sufficiently achieved, while it is a matter of course that the most preferred circuit is such that it capable of varying the time when the injection of fuel by the fuel injection valve 16 starts and the duration of the fuel injection, according to the speed of the rotation of the rotor 3.

Figure 7:
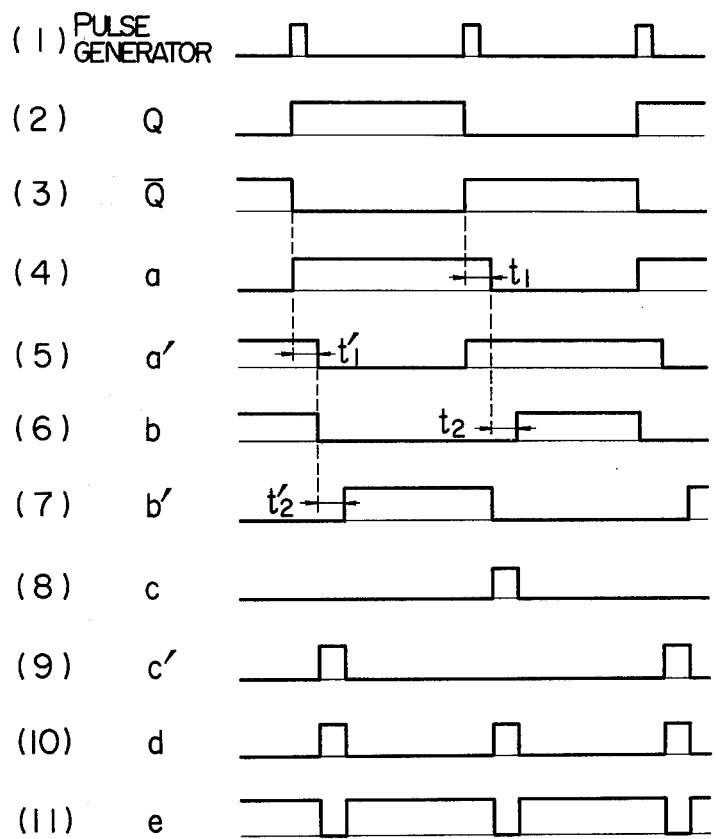
FIG. 7 illustrates electric voltage wave forms at respective points of the circuit shown in FIG. 6.

In FIG. 6, reference 222 denotes an electric power source, 223 a pulse generator, 224 a JK flip-flop circuit, 225, 226, 225', and 226' resistors, 227 and 227' diodes, 228 and 228' capacitors, 229 and 229' "NOT" circuits, 230 and 230' capacitors, 231 and 231' "NOR" circuits, 232 "OR" circuit, 233 a resistor, and 234 a transistor which is connected to the power source 222 in series with the coil 16a of the fuel-injection valve 16. The pulse generator 223 is designed to generate pulse according to the rotation of the rotor 3 so that a pulse is emitted when the rotor comes to the top dead center of the exhaust stroke. The generator may comprise, for example, a lead switch which is operable to be opened and closed by a magnet (not shown) rigidly mounted on the output shaft of the rotor 3 or a rotating shaft of a distributor (not shown) for the ignition plugs 10 and 11, the lead switch being disposed in opposite relationship to the magnet. The wave form of a voltage pulse generated by the pulse generator 223 is diagrammatically illustrated in FIG. 7 (1). The JK flip-flop circuit 224 receives the voltage pulse (1) as an input and emit at its output terminals Q and $\bar{Q}$ outputs of voltage wave forms illustrated in FIG. 7 (2) and (3). The wave form (2) at the terminal $\bar{Q}$ is deformed at a point $a$ (refer to FIG. 6) to a wave form illustrated in FIG. 7 (4) which changes from 1 to 0 with a time lag $t_1$, while the wave form (3) at the output terminal Q is deformed at a point "$a'$" into a wave form illustrated in FIG. 17 (5) which also changes 1 to 0 with a time lag $t'_1$. The time lag $t_1$ depends upon the resistances of the resistors 225 and 226 and the capacitor 228, whereas the time $t'_1$ depends on the resistances of the resistors 225' and 226' and the capacitor 228'. The wave form (4) at the point $a$ is directly received by the NOR circuit 231 as one of the inputs thereof and is also fed into the NOT circuit 229. At a point $b$ after the NOR circuit 229, the voltage wave is deformed into a form illustrated in FIG. 7, which is the other input of the NOT circuit 231. As will be seen in FIG. 7 (4) and (6), the wave form at point $b$ is inverted from the wave form at the point $a$ with a time lag $t_2$ which depends upon the internal resistance of the NOT circuit 229 and the capacity of the capacitor 230. The NOR circuit 231, which has received as its input the wave forms (4) and (6), emits at a point $c$ an output having a wave form illustrated in FIG. 7 (8). Similarly, the wave form at the point $a$ is deformed at points $b$ and $c'$ into wave forms as illustrated in FIG 7 (7) and (9). The time lag $t'_2$ at the point $b'$ depends upon the internal resistance of the NOT circuit 229' and the capacity of the capacitor 230'. The wave forms (8) and (9) at the point $c$ and $c'$ are the inputs of the OR circuit 232 which emits at point $d$ an output having a wave form illustrated in FIG. 9 (10), which causes the transistor to perform an ON-OFF operation. Thus, the voltage point $e$ has a wave form illustrated in FIG. 7 (11). When the transistor 234 is in its ON state, the coil 16$a$ is energized by the power source 222, whereas coil is deenergized when transistor 234 is in its OFF state.

Figure 5:
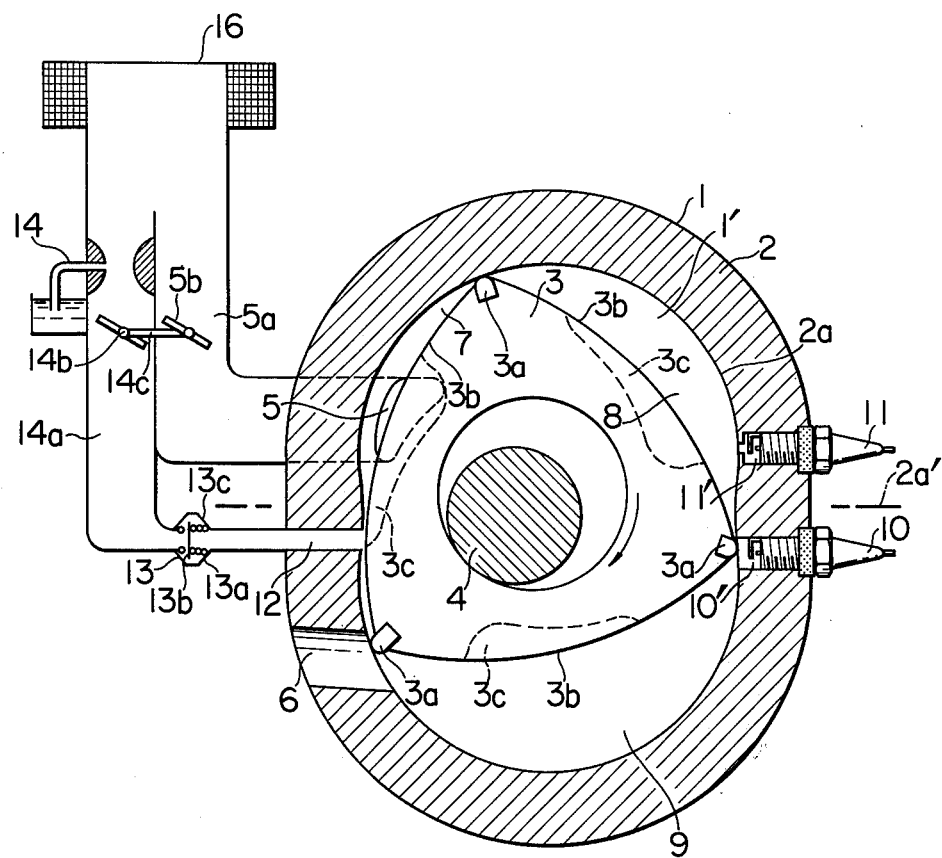
FIG. 5 is a diagrammatic view of a second embodiment of the rotary piston engine according to the present invention.

By equalizing the time lags $t_1$ and $t'_1$ shown in FIG. 7 (4) and (5) and also making equal the time lags $t_2$ and $t'_2$ shown in FIG. 7 (6) and (7), it is possible not only to start the supply of electric current to the coil 16$a$ with a delay $t_1$ from each time when the rotor 3 (FIG. 6) comes to the top dead center of the exhaust stroke, but also to continue the electric current supply for the time length $t_1$ during which the fuel is fed from the fuel injection valve 16 to the pipe 14 (FIG. 5). The time length $t_1$ is set to equal a period from the time when the rotor 3 comes to the top dead center of the exhaust stroke to the time when the exhaust chamber is transformed into an intake chamber (i.e., one apex seal 3$a$ on the rotor has moved past the exhaust port 6) in the operation of the engine at the practically highest speed of the rotor 3, and the time length $t_2$ is set to be equal to a period from the time when the one apex seal 3$a$ has moved past the exhaust port 6 to the time when the communication between the intake chamber and the injection 12 is shut off (i.e., the one apex seal 3$a$ has moved past the injection port 12). As a result of the above, it is possible at least to prevent injection of fuel into exhaust chambers through all over the ranges of the operating speed of the rotor 3 (of course, a consideration must be made on the delay from the time when the fuel is injected into the pipe line 14 where the fuel is formed into an air-fuel mixture to the time when the mixture has been injected through the injection port 12). An air-fuel mixture is, in the pipe line, formed on the downstream side of the fuel-injection valve by means of the above said fuel supply means 15. The quantities of the injected fuel and air are so suitably adjusted as to produce the realtively lean mixture, for example, an air-fuel ratio from 4 to 8.

With the above arrangement, the rotor 3 performs the planetary rotary motion. As the motor 3 is sequentially moved from the bottom dead center of the compression stroke to the top dead center thereof; from the bottom dead center of the exhaust stroke to the top dead center thereof, the working chambers are correspondingly moved, varying their volumes. When a working chamber rendered an intake chamber 7 and communicates with the intake port 5, air is taken into the chamber. When the working chamber becomes a compression chamber, the mixture is compressed and ignited. When the working chamber is further moved and becomes a combustion chamber 8, the mixture is burnt. When the working chamber is further moved and finally becomes an exhaust chamber 9, the combustion products by the combustion are exhausted through the exhaust port 6.

In the operation of the engine described above, through the injection port 12 into the working chamber is fed a fresh air which is passed through the pipe line 14 from the air pump 13, or mixture formed with said air and fuel which is supplied into said air from the fuel supply means 15. The supply means 15 is adapted to supply the fuel, only when the air injection port 12 is in communication with an intake chamber 7. The mixture is, therefore, fed through the injection port 12 into the intake chamber 7 when the injection port is in communication with the intake chamber, while the air alone supplied when the injection port is in communication with the exhaust chamber. When the rotor 3 is in the position shown with phantom line in FIG. 2, i.e., when one of the apex seals 3$a$ of the rotor 3 is between the exhaust port 6 and the injection port, the working chamber 7, 8, and 9 form an intake, a compression and an exhaust chambers, respectively, the chamber 7 and 9 being in the initial state of the working chambers. At this time, the injection port 12 communicates to the intake chamber 7 in the initial state so that fresh mixture is supplied thereto. One of the apex seals 3$a$, as the result of the rotation, has moved over the injection port 12, i.e., the rotor 3 has been in the position shown with a full line in the FIG. 2. Before the rotor has come to the above position, and when the apex seal 3$a$ has passed over the injection port 12, the supply of the fresh mixture is stopped. At this time, the fuel supply means 15 shutoff from supplying the fuel, so that only fresh air become supplied into the success exhaust chamber 9.

Thus, the fresh air fed into the exhaust chamber 9 advantageously acts as such an air-curtain as to prevent completely an exhaust gas from circulating into the intake chamber 7, the exhaust gas being inclined to circulate into the intake chamber 7 without the fresh air. Since only both the mixture and air which is introduced from the intake port 5, are contained in the intake chamber 7, the reliable operation of the engine with an lean mixture is realized. Further above, the fresh air fed into the exhaust chamber acts as such a secondary air as to burn away an unburnt component in the exhaust gas.

It is limited to the time period from the time when one of the apex seals 3a of the rotor 3 has past the exhaust port 6 to the time when the apex aseal 3a has past over the injection port 12, i.e., the period while the intake chamber 7 is in the initial state, that the fresh mixture is fed into the chamber 7 from the injection port 12. An air alone is, then, sucked into the chamber 7 from the intake chamber 5. Therefore, in the intake chamber 7 in the position shown in FIG. 2, the mixture from the injection port 12 is stratified at the leading end portion, respecting to the rotor rotation, and the air introduced from the intake port 5 is stratified at the rear end portion. Then, the rotor 3 has further moved from the position shown with the full line in FIG. 2, and the working chamber has changed into a combustion chamber 8. Until the mixture is ignited by the ignition plugs 10, 11 in the combustion chamber 8 the stratification of the mixture has been substantially maintained in the above state. Since it is, in general, made by the time when the rotor 3 has reached to the top dead center of the compression stroke that the mixture in the working chamber is ignited by the ignition plugs 10, 11, and since the mixture fed from the injection port 12 is maintained at the leading end portion of the working chamber (a combustion chamber), if the mixture is made to be relatively rich, an air-fuel ratio from 4 to 8, the rich mixture having a suitable air-fuel ratio can be stratified adjacent to the ignition plugs so that the reliable combustion is easily possible. Therefore, the unreliable combustion of the mixture is completely made once it is fired. If the mixture from the injection port 12 is set to a suitable air-fuel ratio to burn, the reliable operation of the engine is assured, although the air-fuel ratio of the mixture, as a whole, within the working chamber is low. It is, thus, naturally possible that the purification of the exhaust gas and the economical fuel consumption are realized by burning the lean mixture as a whole.

The above said stratification is promoted by the prescence of the recesses 3c provided in the sides 3b of the rotor 3. The recess 3c forms a part of the working chamber. Each of the reecesses 3c is formed into such that the depth of the leading end portion of the recess 3c is larger than that of the trailing end portion and said depth is gradually increased from the rear to the leading with respect to the rotor rotation. For this construction of the recess, the mixture from the injection port 12 flows through the recess to the leading end portion of the working chamber so that the above-said stratification is further promoted. The decreasing rate of the depth from the leading to the trailing is preferably made to be less and less so that the stratification of the mixture fed from the port 12 at the leading end portion is more assured. Feeding the air alone from the intake port 5, only air is stratified at the trailing end portion where the combustion come to to be difficult because of having the large surface-volume ratio. Therefore, hydrocarbon (HC) is not exsists there so that unburnt hydrocarbon would not be exhausted, although an ignited fire may not reach there.

Figure 3:
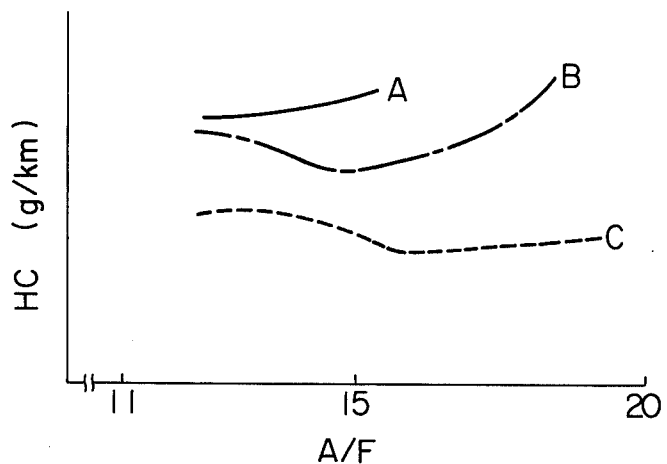
FIGS. 3 and 4 show the effects of the rotary piston engine according to the present invention.
Figure 4:
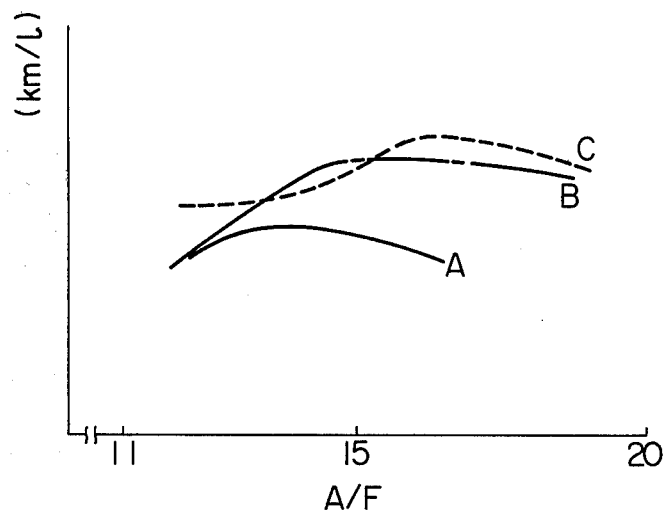

In actual case, a little fuel exist at the trailing end portion of the working chamber, but its amount is so few that the amount of the hydrocarbon (HC) which is to be exhausted can be negligible. It has been experimentally proved. FIG. 3 and FIG. 4 show test results from the experiments of the various-type rotary piston engines. FIG. 3 and FIG. 4 give the amounts of the exhausted hydrocarbon and of the fuel consumption, respectively, v.s. air-fuel ratio during vehicle running at a speed of 60 km/hour. In these figures, curves A show the test results of a rotary piston engine without the injection port; curves B indicate that of a rotary piston engine into which a rich mixture is fed from the injection port as well as a lean mixture from the intake port; curves C give that of a rotary piston engine according to the present embodiment into which a rich mixture is fed from the injection port and an air alone fed from the intake port. It is clear from the results that, by feeding a rich mixture from the injection port and an air alone from the intake port, the amount of the exhausted hydrocarbon can be considerably reduced and the economical fuel consumption is improved.

In the above embodiment, the supply of the mixture is limited to the time period while the injection port communicates with the intake chamber, controlling the fuel supply means 15. It may, however, be possible to supply the fuel at all times.

FIG. 5 shows another embodiment of the present invention, wherein an intake pipe line 14a having a throttle valve 14b is connected to the port 12, in this case the port 12 becomes of suction-type. The pipe line 14a is branched from a main intake pipe 5a communicated with an intake port 5. A non-return valve 13 is provided to the pipe line 14a on the downstream side of the throttle valve 14b. The none-return valve 13 is adapted to prevent an exhaust gas from flowing into the intake pipe line 14a through the port 12 when the exhaust gas flows from an exhaust chamber into an intake chamber by way of an exhausted port, which happens in a rotor position shown in FIG. 5, or when the port 12 communicates with the exhaust chamber. The valve 13 comprises a spring 13a, a valve 13b, and a housing case 13c. Reference number 14 indicates a fuel supply means of venturi type which is used in common car. The fuel supply means 14 is adapted to supply a fuel through the intake pipe line 14a into the port 12. By setting a mixture in the pipe line 14a to be rich, approximately 8 of air-fuel ratio, the reliable combustion in a working chamber can be attained. The throttle valve 14b is cooperated with the main throttle valve 5b by means of a linkage 14c.

During the operation of the engine in this embodiment, when the rotor 3 has past the top dead center of exhaust stroke, the working chamber is transformed into an intake chamber. In the initial state of the intake stroke, the working chamber introduces the rich mixture from the port 12. Then, the chamber sucks the air from the intake port 5, when the intake port is opened to the working chamber in the final state of the intake stroke. The rich mixture is stratified at the leading end portion, while the air alone stratified at the trailing end portion. When the rotor 3 has further moved and the working chamber has been transformed into a combustion chamber, the stratification is still maintained so that the mixture can be easily fired by the ignition plugs 10, 11. Few fuel exist at the rear end portion of the working chamber where the combustion comes to be difficult, therefore, the amount of the exhausted unburnt fuel can be negligible.

The amounts of the mixture from the port 12 and the air from the intake port 5 are regulated by the throttle 14b and main throttle 5b, respectively.

In this embodiment as well as the first embodiment, it is particularly pointed out that the rich mixture, which is readily ignitable, can be so distributed within the working chamber 9 so as to be placed adjacent to the ignition plugs in order to obtain reliable ignition thereof. Thus, the mixture within the working chamber, which is relatively lean as a whole, completely burnt so as to minimized the amounts of the exhausted CO and HC.

We claim:

1. A rotary piston engine comprising:

housing means having a trochoidal peripheral wall and side walls, rotor means disposed within said housing and having sides cooperating with the peripheral and side walls of said housing to define a plurality of working chambers respectively, said rotor means being operable to perform a planetary rotary movement causing the engine to perform intake, compression, combustion and exhaust strokes, first intake port means formed in a portion of said housing which is on the leading side in a rotational direction of said rotor means with respect to the minor axis of trochoidal curves of said peripheral wall, said first intake port being adapted to open into one of said working chambers which is in the intake stroke, and exhaust port means opening to a portion within the housing which is on the trailing side in a rotational direction of said rotor means with respect to the minor axis, wherein the improvement comprises:

second intake port means formed in a portion of said housing between said exhaust port means and the minor axis of the trochoidal curves, said second intake port means being adapted to directly open into one of said working chambers which is at the initial stage of the intake stroke, means connected to said second intake port means for supplying rich mixture into said working chambers through said second intake port means, and means connected to said first intake port means for supplying air only into said working chambers through said first intake port means.

2. A rotary piston engine according to claim 1, wherein said rotor means is formed with at least one recess in its peripheral walls, respectively, each of said recesses having a depth which is gradually decreasing along the corresponding peripheral wall from the leading side to the trailing side in the rotational direction of said rotor means.

3. A rotary piston engine according to claim 1, wherein said rich mixture supplying means comprises means for supplying air under pressure to said second intake port means and means for supplying fuel into the air supplied by the latter air supplying means.

4. A rotary piston engine according to claim 3, wherein said fuel supplying means includes a solenoid valve energized by electric signals to inject fuel into said engine, a fuel pump for supplying fuel to said solenoid valve and control means which transmits signals to said solenoid valve.

5. A rotary piston engine according to claim 4, wherein said control means actuates said solenoid valve to inject fuel only when said second intake port means is in communication with the working chamber which is at the initial stage of the intake stroke.

6. A rotary piston engine according to claim 1, wherein said rich mixture supplying means comprises a carburetter producing rich mixture, an intake pipe connecting between said carburetter and second intake port, a none-return valve provided in said second intake pipe to permit only the rich mixture to flow from said carburetter to said second intake port.

7. A rotary piston engine comprising:

housing means having a trochoidal peripheral wall and side walls, rotor means disposed within said housing and having sides cooperating with the peripheral and side walls of said housing to define a plurality of working chambers respectively, said rotor means being operable to perform a planetary rotary movement causing the engine to perform intake, compression, combustion and exhaust strokes, first intake port means formed in said housing and adapted to open into one of said working chambers which is in the intake stroke, said first intake port means being supplied with only air and feeding the same therethrough into the latter working chamber, second intake port means opening to a portion within the housing which is on the trailing side in the rotational direction of said rotor means with respect to said first intake port means, said second intake port means being supplied with rich mixture and feeding the same therethrough directly into the working chamber which is at the intial stage of the intake stroke, and exhaust port means opening to a portion within the housing which is on the trailing side in the rotational direction of said rotor means with respect to said second intake port means for discharging exhaust gas contained within the working chamber in the exhaust stroke.

* * * * *